United States Patent Office 3,631,200
Patented Dec. 28, 1971

3,631,200
PROCESS FOR THE PREPARATION OF CARBONATE-GROUP-CONTAINING DIHYDROXY COMPOUNDS
Rudolf Nehring and Wolfgang Seeliger, Marl, Germany, assignors to Chemische Werke Huls Aktiengesellschaft, Marl, Germany
No Drawing. Filed Jan. 19, 1967, Ser. No. 610,230
Claims priority, application Germany, Feb. 11, 1966, C 38,191; Sept. 24, 1966, C 40,188, C 40,189
Int. Cl. C07c 69/00
U.S. Cl. 260—463
5 Claims

ABSTRACT OF THE DISCLOSURE

Process for the preparation of a diol containing carbonate groups, having the general formula:

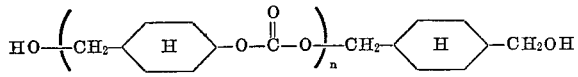

in which the average value of $n$ ranges from 1 to 32 which consists in completely reacting at 1,4-bis-(hydroxymethyl)-cyclohexane with phosgene at a molar ratio ranging from 1:0.5 to 1:0.97, in the presence of an inert diluent in which are soluble both the starting products and the final products, under normal pressure and at a reaction temperature not higher than 75° C., and upon conclusion of the reaction distilling off the solvent while passing an inert gas through the reaction mixture thereby removing HCl in free form.

The invention relates to a process for the preparation of carbonate - group - containing diols of the general formula

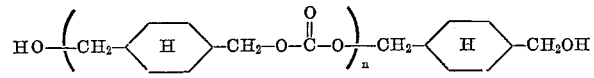

where the mean value for $n$ is within the range from 1 to 32.

The preparation of polycarbonates with hydroxyl end groups is already known from German Pat. No. 857,948. This is accomplished by reacting bischlorocarbonic acid esters of aliphatic diols with aliphatic diols. Due to the low reactivity of aliphatic bischlorocarbonic acid esters it is necessary to perform the reaction at increased temperatures. This leads to side-reactions in which through the separation of carbon dioxide from the chlorocarbonic acid esters or by substitution of the hydroxyl groups by the hydrogen chloride present in the reaction mixture, chloroalkyl compounds will be formed. These chlorine-containing products can have the effect of a chain terminator in case of polycondensation or polyaddition because of the lacking hydroxy end groups, thereby preventing the preparation of high-molecular polycarbonates or the obtaining of long-chain polyurethanes by the reaction with diisocyanates (H. Schnell, Chemistry and Phyhics of Polycarbonates, Interscience Publishers, New York; London, Sydney—1964, page 10).

Said above-mentioned German patent proposes, in order to prevent the formation of chloroalkyl end groups, to carry out the reaction of the aliphatic bichlorocarbonic acid esters with the aliphatic diols at a reduced pressure. In this way the hydrogen chloride formed is immediately removed from the reaction medium. However, this measure serves only to avoid the chloroalkyl formation from hydroxyl-groups and hydrogenchloride while the chloroalkyl formation caused by the separation of carbon dioxide from the chlorocarbonic acid esters is rather promoted by the low pressure. As a matter of fact, a comparative test did demonstrate that in case of a reaction of 1,4-bis-(hydroxy - methyl) - cyclohexane-bischlorocarbonate with 1,4-bis(hydroxymethyl)-cyclohexane in a water-pump vacuum a product was obtained with a 3% chlorine content.

The known process has the additional disadvantage that the bischlorocarbonates employed must be prepared by a separate process, for example from phosgene and aliphatic diols according to DAS No. 1 187 608.

U.S. Pat. 3,046,255 describes the preparation of polycarbonates by interface polycondensation of bischlorocarbonates or phosgene with diols, with the aqueous solutions or suspensions of inorganic alkaline substances serving as hydrogen chloride acceptors. Under this method the liberated hydrogen chloride is transformed into the chloride of an alkali metal or alkaline earth metal and thus withdrawn from further technical use. The occurance of large quantities of alkaline chloride solutions is another disadvantageous feature of this condensation process.

It is known from U.S. Pat. 2,999,844 to accomplish the polycondensation of bischlorocarbonates (or the intermediate products obtained from phosgene and diols) with diols in inert organic solvents such as toluene or xylene. (Alkali metal or alkaline earth metal hydroxides or carbonates are suspended in these solvents to act as hydrogen chloride acceptors. The water formed is removed from the reaction mixture by azeotropic distillation. The products obtained by this method are yellowish-brown, a fact which limits their use substantially. Again, this process results in the disadvantageous yield of large quantities of alkali metal or alkaline earth metal carbonate (or hydroxide)-alkalichloride mixtures.

It is also known from U.S. Pat. No. 2,517,965 that in the production of carbonic acid esters from hydroxyl compounds and chloroformates according to the reaction equation

products are obtained which contain large amounts, generally several percent, of chlorine (see col. 3, lines 14–18). It has already been attempted to carry out the reaction in such inert solvents as toluene and carbontetrachloride which have only a low solvent capacity for the hydrogen chloride formed and thus to produce products having low chlorine contents. Neither this process nor the use of alkali lyes or strong organic bases as binding agents for the hydrogen chloride will give practically chlorine-free products (col. 1, lines 14–18). In the named U.S.A. patent therefore an after treatment of the carbonate ester with ammonia or ammonium compounds is considered to be necessary in order to obtain practically chlorine-free products.

The present invention solves the problem of preparing chlorine-free, colorless, carbonate-group-containing dihydroxy compounds of the above given general formula by a single stage process without the conversion of the liberated hydrogen chloride into metal chlorides. The invention solves this problem by causing 1,4-bis-(hydroxymethyl)-cyclohexane and phosgene in a molar ratio within the range from 1:0.5 to 1:0.97 to react at atmospheric pressure in the presence of an inert solvent.

1,4-bis-(hydroxymethyl)-cyclohexane can be employed in its trans- or cis-form or as a mixture thereof.

Inert solvents to be used are preferably substances with boiling points between 70 and 140° C. at standard pressures, for example benzene, toluene or xylene.

The determination of the value of $n$ within the limits given above can be accomplished simply by varying the molar ratio of the reactants. For example, if one chooses e.g. a molar ratio of 1,4-bis-(hydroxymethyl)-cyclohexane to phosgene of 1:0.5, the result will be a carbonate-group containing diol with $n=1$ according to the reacting equation

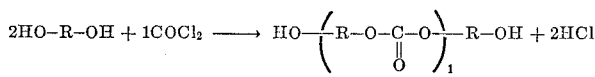

in which R stands for the 1,4-dimethylene-cyclohexane residue. With a molar ratio of 1,4-bis-(hydroxymethyl)-cyclohexane to phosgene of 1:0.97 the result will be a polycarbonate with a median value of $n=32$ in accordance with the reaction equation

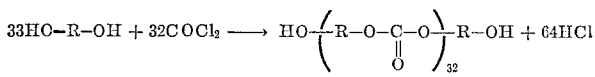

The process is carried out by introducing, under vigorous stirring, the calculated quantity of phosgene in gaseous form into the mixture of 1,4-bis-(hydroxymethyl)-cyclohexane and an inert solvent at a temperature not above 75° C., preferably 20 to 50° C. When the phosgene is no longer being completely absorbed its introduction is continued at lower temperatures, for example between 5 and 20° C.

In another procedure in accordance with the invention the phosgene is first dissolved in the inert solvent and this solution is then added under stirring to the 1,4-bis-(hydroxymethyl)-cyclohexane which may be diluted with inert solvent. This method permits a rapid introduction and very precise metering of the phosgene.

In both cases the hydrogen chloride generated is expelled from the reaction mixture in free form, possibly with a flow of inert gas and can be used without further purification for any industrial use. The solvent is then removed by distillation, possibly under reduced pressure. The oligomeric, hydroxyl-end-group containing carbonate of great purity and almost quantitative yield remains in the form of a colorless residue.

It is unexpected and surprising that the process of the invention results in practically chlorine-free, carbonate-group-containing dihydroxy-compounds even though the reaction of the diol with the phosgene generates approximately twice as much hydrogen chloride as the use of bi-chlorocarbonates, and in spite of the fact that this hydrogen chloride is not removed immediately from the reaction mixture either by acid-binding media or by a reduction in pressure.

The products so obtained are very pure and can be used directly without purification for the preparation of high-molecular polyadducts or condensates. For example, it was possible to convert an oligomeric 1,4-bis-(hydroxymethyl)-cyclohexane carbonate of the above given formula ($n=3$) with a median molecular weight of 634, prepared in accordance with the invention with an equimolecular quantity of diphenylmethane-4,4'-diisocyanate into a linear polyurethane with a K-value of 50 without the use of an accelerator.

The oligomeric carbonates are excellent plasticizers, especially for polyvinylhalides such as polyvinylchloride, polyvinylidenechloride and copolymers of vinylchloride and vinylacetate. They can also be used as diol-components for the manufacture of polyurethanes. Especially useful are the diols, in which the mean values for $n$ are within the range from 1 to 14.

The process of the present invention has a surprising character. In view of the state of the art, particularly the disclosure in the U.S.A. Pat. No. 2,517,965 it was not to be expected that the reaction of 1,4-bis(hydroxymethyl)-cyclohexane with phosgene alone in the presence of toluene would result in practically chlorine-free ($<0.3\%$) carbonates. Also in accordance with the process of the present invention chloroformates are formed first according to the following reaction equation

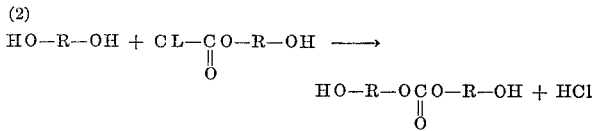

(see H. Schnell, Chemistry and Physics of Polycarbonates, Interscience Publishers, New York, London, Sydney—1964, page 9, Equation III–1).

This chloroformate then reacts according to the equation

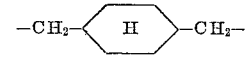

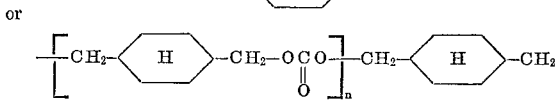

R in Equations 1 and 2 above stands for one of the groups $$-CH_2-\!\!\bigcirc\!\!-CH_2-$$

or $$\left[-CH_2-\!\!\bigcirc\!\!-CH_2-O\underset{\underset{O}{\|}}{C}O-\right]_n-CH_2-\!\!\bigcirc\!\!-CH_2$$

In both the process of the present invention and the process of U.S.A. Pat. No. 2,517,965 chloroformates having aliphatically bound OH groups are reacted. Nevertheless in the process of the invention and the process of the invention the product is practically chlorine-free while the known process gives products having high chlorine contents which require after treatment with ammonia or ammonium compounds. This result of the invention is even more surprising because the reaction mixture need not be treated with either an organic or an inorganic hydrogen chloride acceptor in order to separate the hydrogen chloride present as well as to hydrolyze the unreacted chlorocarbonate groups. It is sufficient to heat the reaction mixture in a vacuum to 120° C. and pass a stream of nitrogen through it to drive out all of the hydrogen chloride together with the solvent.

EXAMPLE 1

The following example describes the preparation of an oligomeric carbonate with one carbonate group ($n=1$).

Into a mixture of 1154 parts by weight (8 mols) of 1,4-bis-(hydroxymethyl) - cyclohexane (50% trans-content) and 400 parts by weight of toluene there was introduced under vigorous stirring and at approximately 47° C., 396 parts by weight (4 mols) of phosgene over a period of 4 to 5 hours. The reaction mixture was then stirred for 14 hours at approximately 20° C. and thereupon heated gradually over a period of 5 hours to 120° C. under introduction of nitrogen, with the hydrogen chloride escaping and finally the toluene was removed by distillation. The contents of the container was then freed of any residues of the solvent by heating for a period of 3 hours at 120° C. and at a pressure of 10 to 12 torr. There remained 1260 parts by weight of a colorless, transparent and viscous carbonate with a hydroxyl number of 369 (see the table).

EXAMPLE 2

The following example describes the preparation of an oligomeric carbonate with an average of two carbonate groups ($n=2$).

Into a mixture of 865 parts by weight (6 mols) of 1,4-bis-(hydroxymethyl)-cyclohexane (50% trans-content) and 300 parts by weight of toluene there was introduced under vigorous stirring at a temperature ranging from 45 to 50° C., 245 parts by weight (2.5 mols) of phosgene, followed by 151 parts by weight (1.5 mols) of phosgene at 10 to 15° C. The reaction product was then stirred at room temperature for approximately 15 hours, and thereupon heated gradually over a period of 5 hours to 120° C. with nitrogen being passed through, thereby removing any remaining hydrogen chloride and finally the toluene was removed by distillation. The contents of the container was subsequently treated for another 3 hours at 120° C. and at 5 to 20 torr. The yield was 960 parts by weight of a transparent, colorless oligomeric carbonate with a hydroxyl number of 239 (see the table).

EXAMPLE 3

The following example describes the preparation of an oligomeric carbonate with an average of three carbonate groups ($n=3$).

Into a mixture of 1152 parts by weight (8 mols) of 1,4-bis-(hydroxymethyl)-cyclohexane (50% trans-content) and 400 parts by weight of toluene there was introduced under vigorous stirring at 45° C. over a period of 3 hours 365 parts by weight (3.7 mols) of phosgene. The contents of the container was then cooled to about 10° C. and 230 parts by weight (2.3 mols), of the gaseous phosgene was then introduced at this temperature over a period of 3 hours. The reaction mixture was stirred for approximately 14 hours at 20° C. during which period the bulk of the hydrogen chloride was expelled. The mixture was thereupon heated within 4 hours up to 120° C., with nitrogen being introduced and the toluene removed by distillation. The contents of the container was freed of solvent over a period of 3 hours at 120° C. and 12 torr. There remained 1285 parts by weight of a colorless, transparent, oligomeric carbonate with a hydroxyl number of 176 (see the table).

EXAMPLE 4

The following example describes the preparation of an oligomeric carbonate with an average of five carbonate groups ($n=5$).

Into a mixture of 865 parts by weight of bis-(1,4-hydroxymethyl)-cyclohexane (6 mols) and 350 parts by weight of toluene there was introduced under vigorous stirring at 45 to 50° C., 375 parts by weight (3.8 mols) of phosgene and then another 120 parts by weight (1.2 mols) of phosgene at 10 to 15° C. The reaction product was then further processed as described above in Example 3. There remained 980 parts by weight of a colorless and transparent, oligomeric carbonate with a hydroxyl number of 115 (see the table).

EXAMPLE 5

The following example describes the preparation of an oligomeric carbonate with an average of three carbonate groups ($n=3$).

594 parts by weight (6 mols) of liquid phosgene was dissolved in 700 parts by weight of toluene; this solution was added drop-by-drop over a period of 1 hour under stirring to 1152 parts by weight (8 mols) of 1,4-bis-(hydroxymethyl)-cyclohexane (75% trans-content) which had been heated to 45 to 50° C. Upon completion of the addition the reaction mixture was stirred for 1 hour at approximately 50° C. and then heated to 120° C. while being stirred and subjected to a flow-through of nitrogen. The bulk of the hydrogen chloride generated escaped and the solvent removed by distillation. The contents of the container was freed of solvent residue by heating to 120° C. and application of a vacuum of <10 torr over a period of 2 hours. There remained 1280 parts by weight of a colorless, transparent and viscous carbonate with a hydroxyl number of 167 (see the table).

EXAMPLE 6

The following example describes the preparation of an oligomeric carbonate with an average of five carbonate groups ($n=5$).

495 parts by weight (5 mols) of liquid phosgene was dissolved in 600 parts by weight of toluene. This solution was added drop-by-drop over a period of 1 hour under stirring to 864 parts by weight (6 mols) of 1,4-bis-(hydroxymethyl)-cyclohexane (75% trans-content) which had been heated to 45 to 50° C. Upon completion of the addition the reaction mixture was stirred for 1 hour at approximately 50° C. and then heated to 120° C. in a flow of nitrogen. The bulk of the hydrogen chloride escaped and the solvent was removed by distillation. The contents of the container was freed of solvent residue by heating to 120° C. and application of a vacuum of <10 torr over a period of 2 hours. There remained 990 parts of a colorless and highly viscous oligomeric carbonate (see the table).

EXAMPLE 7

The following example describes the preparation of an oligomeric carbonate with an average of nine carbonate groups ($n=9$).

446 parts by weight (4.5 mols) of liquid phosgene was dissolved in 550 parts by weight of toluene. This solution was added drop-by-drop over a period of 1 hour under stirring to 721 parts by weight (5 mols) of 1,4-bis-(hydroxymethyl)-cyclohexane (75% trans-content) which had been heated to 45 to 50° C. Upon completion of the addition the reaction mixture was stirred for 1 hour at approximately 50° C. and then heated to 120° C. with a flow of nitrogen. The bulk of the hydrogen chloride escaped and the solvent was removed by distillation. The contents of the container was freed of solvent residue by heating to 120° C. and application of a vacuum of <10 torr over a period of 2 hours. There remained 820 parts by weight of a colorless, thermoplastic, transparent, oligomeric carbonate (see the table).

EXAMPLE 8

The following example describes the production of an oligomeric carbonate having an average of 11 carbonate groups ($n=11$).

Into a mixture of 865 parts (6 mols) of 1,4-bis-(hydroxymethyl)-cyclohexane (75% trans-content) and 400 parts of toluene was introduced 375 parts (3.8 mol) at about 45° C., and then 170 parts (1.7 mol) of gaseous phosgene at 10 to 20° C. with vigorous stirring. The reaction mixture was then stirred for 14 hours at 20° C. and then heated up to 120° C. while stirring and passing a stream of nitrogen through it. In this way the remaining hydrogen chloride was expelled and the solvent was distilled out. The contents of the reaction vessel was then freed of residual solvent by heating for 2 hours at 120° C. under a vacuum of <10 torr and there remained 980 parts of a colorless, transparent condensate that was solid at room temperature (see the table).

EXAMPLE 9

This example describes the production of an oligomeric carbonate having an average carbonate group content of 13 ($n=13$).

321 parts (3.25 mol) of liquid phosgene was dissolved in 430 parts of toluene and the solution was introduced dropwise, over a period of 1 hour and with stirring into 504 parts (3.5 mol) of 1,4-bis-(hydroxymethyl)-cyclohexane (75% trans-content) which was heated to 45° C. The resulting reaction mixture was stirred first for 1 hour at 10° C. and then for another hour at about 50° C. and then, while passing a stream of nitrogen through it and stirring, it was heated up to 120° C. In this way the bulk of the hydrogen chloride was expelled and the solvent was distilled out. The contents of the reaction vessel was freed of residual solvent within 2 hours by heating to 120° C. and applying a vacuum of <12 torr. There remained 570 parts of a colorless and transparent resin (see the table).

EXAMPLE 10

This example describes the production of an oligomeric carbonate having an average carbonate group content of 18 ($n=18$).

445 parts (4.5 mol) of liquid phosgene was dissolved in 600 parts of toluene and the resulting solution was introduced dropwise with stirring into 685 parts (4.75 mol) of 1,4-bis-(hydroxymethyl)-cyclohexane (75% trans-content) that was heated to 45° C. The resulting reaction mixture was stirred for 1 hour at 10° C. and for another hour at about 50° C. and finally heated with stirring and while passing a stream of nitrogen heated up to 120° C. In this way the bulk of the hydrogen chloride was expelled and the solvent distilled out. The contents of the reaction vessel was then freed of residual solvent within 2 hours by heating to 120° C. and applying a vacuum of <15 torr. There remained 790 parts of a colorless and transparent resin (see the table).

EXAMPLE 11

This example describes the production of an oligomeric carbonate having an average carbonate group content of 25 ($n=25$).

495 parts (5 mol) of liquid phosgene was dissolved in 650 parts of toluene and the resulting solution was introduced dropwise with stirring into 750 parts (5.2 mol) of 1,4-bis-(hydroxymethyl)-cyclohexane (75% trans-content) heated to 45° C. The resulting reaction mixture was stirred for 1 hour at 10° C. and then for another hour at about 50° C. and then heated up to 120° C. with stirring and passing a stream of nitrogen. In this way the bulk of the hydrogen chloride was expelled and the solvent distilled out. The contents of the reaction vessel was then freed of residual solvent within 2 hours by heating to 120° C. and applying a vacuum of <15 torr. There remained 835 parts of a colorless and transparent resin (see the table).

TABLE

| Example | Number of carbonate groups in the oligomeric carbonate | OH-number | Molecular weight Calculated from OH-number | Found | Calculated |
|---|---|---|---|---|---|
| 1 | 1 | 369 | 304 | [1] 320 | 314 |
| 2 | 2 | 239 | 469 | [1] 430 | 484 |
| 3 | 3 | 176 | 637 | [1] 630 | 655 |
| 4 | 5 | 115 | 975 | | 995 |
| 5 | 3 | 167 | 670 | [2] 660 | 655 |
| 6 | 5 | | | [2] 1,050 | 995 |
| 7 | 9 | | | [2] 1,690 | 1,676 |
| 8 | 11 | | | 1,920 | 2,017 |
| 9 | 13 | | | 2,400 | 2,357 |
| 10 | 18 | | | 3,100 | 3,208 |
| 11 | 25 | | | 4,200 | 4,399 |

[1] Determined ebullioscopically.
[2] Determined by vapor pressure osmosis.

COMPARISON EXAMPLE 94 parts by weight (.35 mol) of 1,4-bis-hydroxymethyl-cyclohexane-bis-chlorocarbonate (50% trans-content) and 72 parts by weight (0.5 mol) of 1,4-bis-(hydroxymethyl)-cyclohexane (50% trans-content) were mixed and then heated in the vacuum of a water jet pump for 2 hours to 110° C., for 5 hours to 120° C., and for 2 hours to 150° C. The elementary analysis of the product so obtained showed a chlorine content of 3.01%. The reaction product was not suitable for the preparation of high molecular polycondensation or polyaddition product.

We claim:
1. Process for the preparation of a diol containing carbonate groups, having the general formula

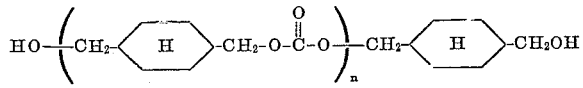

in which the average value of $n$ ranges from 1 to 32, which consists in completely reacting a 1,4-bis(hydroxymethyl)-cyclohexane with phosgene at a molar ratio ranging from 1:0.5 to 1:0.97, in the presence of an inert diluent in which are soluble both the starting product and the final products, under normal pressure and at a reaction temperature not higher than 75° C.; and upon conclusion of the reaction distilling off the solvent while passing an inert gas through the reaction mixture thereby removing HCl in free form.

2. The process defined in claim 1, wherein the mean value of $n$ is within the range from 1 to 14 and wherein the molar ratio of the 1,4-bis-(hydroxymethyl)-cyclohexane to phosgene is within the range from 1:0.5 to 1:0.933.

3. A process according to claim 1 wherein phosgene is gased into a mixture of 1,4-bis(hydroxymethyl)-cyclohexane and inert solvent with vigorous stirring at first at 20° to 50° C. and then at a temperature lower than 20° C.

4. A process according to claim 1 wherein the inert solvent has a boiling point at standard pressure of from 70° to 140° C.

5. A process according to claim 1 wherein the inert solvent is benzene, toluene and xylene.

References Cited

UNITED STATES PATENTS

| 3,046,255 | 7/1962 | Strain et al. | 260—77.5 |
| 3,359,242 | 12/1967 | Seeliger | 260—77.5 |
| 2,999,844 | 9/1961 | Müller et al. | 260—47 |

OTHER REFERENCES

Sarel et al. J. Org. Chem., 24, 1873 (1959).
W. Christopher and D. Fox, Polycarbonates, Reinhold (New York, 1962).
H. Schnell, Angew. Chem., 68 (20), 633–640 (1956) (translation by Associated Technical Services, Inc.).

LEON ZITVER, Primary Examiner
L. DE CRESCENTE, Assistant Examiner